United States Patent [19]

Lee

[11] 4,062,115
[45] Dec. 13, 1977

[54] ROTARY GARDEN CUTTER
[75] Inventor: William R. Lee, Calimesa, Calif.
[73] Assignee: Leeco Manufacturing, Inc., Calimesa, Calif.
[21] Appl. No.: 738,320
[22] Filed: Nov. 2, 1976
[51] Int. Cl.² .............................................. A01D 55/18
[52] U.S. Cl. ....................................... 30/276; 15/198; 56/12.7
[58] Field of Search ...................... 30/276, 347; 56/295, 56/12.7; 15/195, 205, 198

[56] References Cited
U.S. PATENT DOCUMENTS

| | | | |
|---|---|---|---|
| 181,416 | 8/1876 | Davis | 15/198 X |
| 1,526,579 | 2/1925 | Albertson | 15/198 |
| 2,102,178 | 12/1937 | Gerhardt | 15/198 X |
| 2,663,137 | 12/1953 | Asbury | 56/295 |

Primary Examiner—Jimmy C. Peters
Attorney, Agent, or Firm—Flam & Flam

[57] ABSTRACT

A rotary garden cutter utilizes a series of flexible cutter lines conveniently attached to a cutter head. Each cutter line threads into and out of companion apertures in the peripheral wall of the cutter head skirt. Parts of apertures extend circumferentially about the cutter head. A generally cylindrical detachable clamp part fits into the skirt to hold the cutter lines in place. Worn lines are easily removed and new lines readily installed.

5 Claims, 6 Drawing Figures

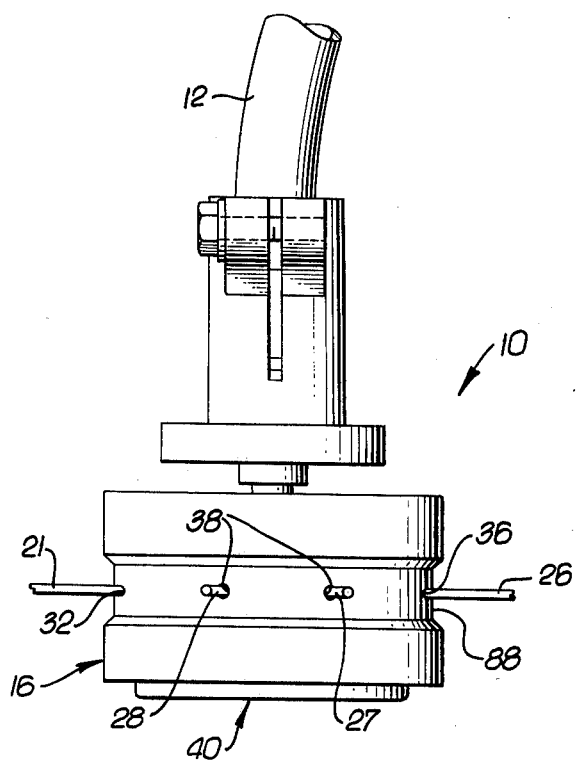
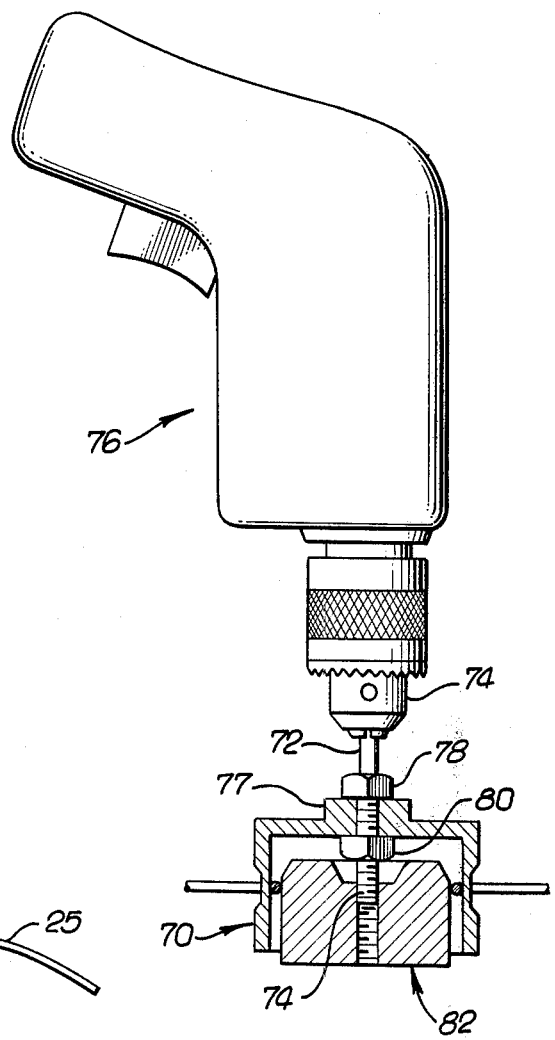
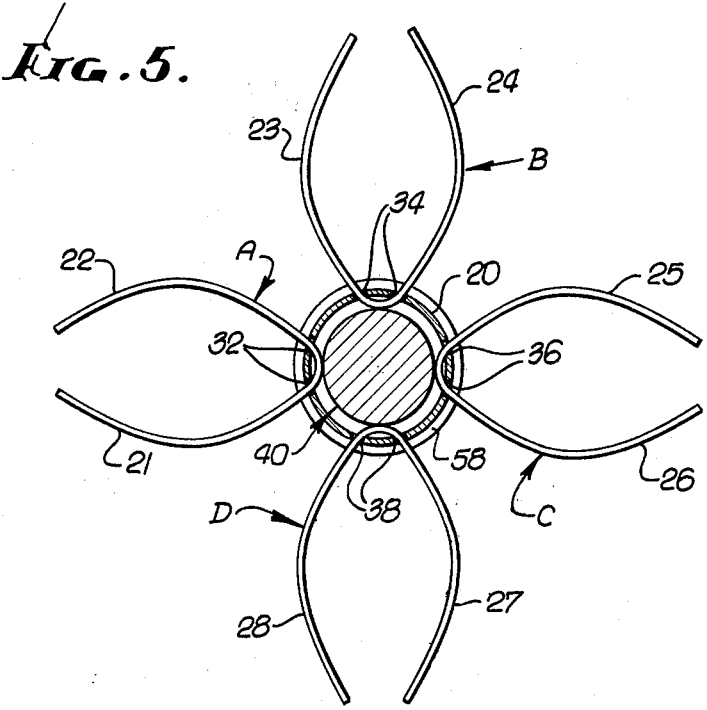

ROTARY GARDEN CUTTER

FIELD OF INVENTION

This invention relates to a garden cutter utilizing rotating lines such as shown and described in U.S. Pat. No. 3,708,967 issued on Jan. 9, 1973 to Thomas N. Geist and George C. Ballas and entitled ROTARY CUTTING ASSEMBLY.

BACKGROUND OF THE INVENTION

In recent years, flexible line rotary garden cutters have been popularized. Such cutters utilize a rotating hub with lines attached to the hub periphery. The statically flexible lines form a semi-rigid blade when rotated at high speed. The efficient cutting capability of such flexible line cutters has been successfully demonstrated. If the lines encounter relatively rigid objects, the filaments yield. Accordingly, all else equal, flexible line cutters are less hazardous than cutters utilizing rigid blades.

The flexible line has a relatively short life. Replacement is often necessary. The Geist and Ballas patent suggests the use of storage spools with releasable wedge locks whereby the line can be renewed. Another arrangement suggested by Geist and Ballas is one in which the precut line lengths are tied at apertures in the rotating hub. The wedge lock and spool arrangement is not entirely satisfactory because there is no positive control of the length of the line. The operator tends to use too much or too little line, violating the optimal relationship between line radius and rotational speed. The precut and tie arrangement maintains the optimal relationship of line length or radius to rotational speed, but the operations necessary to untie the old line and tie the new line is quite cumbersome.

The primary object of the present invention is to provide a flexible line cutter in which the worn line is easily removed and new sized line readily installed.

In known prior art devices, the line may be broken if it is caught between the rotary hub and a relatively rigid object, such as stonework or curbing. Another object of the present invention is to provide simple means for protecting the line from such hazard whereby the already short life of the flexible line is not further imperiled.

Another object of the present invention is to provide a releasable clamping device for pre-sized line that gently, yet firmly clamps the line in position without imposition of excessive localized stress.

SUMMARY OF THE INVENTION

In order to accomplish the foregoing objects, I provide a rotary cutter head that has a number of pairs of apertures in its skirt. An equal number of cutting lines are provided, one for each pair of apertures. Each cutting line is easily threaded from the outside into one of the apertures of the pair and then out from the companion aperture of the pair. The cutting line is caught at its center so that two sections of the line are positioned for centrifugal extension. A simple clamping ring snaps or threads into the skirt to lock the cutting lines into position.

In order to save the cutting line from damages should the cutter head impinge at stonework or at a curb, the periphery of the skirt has an annular groove where the cutting lines emerge. Accordingly, the cutting line has a safe place for retreat should the cutting head come too close to an unyielding object.

BRIEF DESCRIPTION OF DRAWINGS

A detailed description of the invention will be made with reference to the accompanying drawings wherein like numerals designate corresponding parts in the several figures. These drawings, unless described as diagrammatic or unless otherwise indicated, are to scale.

FIG. 4 is an elevational view of the cutter head and taken in the direction indicated by line 4—4 of FIG. 3.

FIG. 5 is a sectional view taken along a plane indicated by line 5—5 of FIG. 3, and showing the cutter head at rest.

FIG. 6 is a sectional view similar to FIG. 3 but illustrating a modified cutter head for cooperation with a power head having a chuck, such as a hand drill.

DETAILED DESCRIPTION OF PREFERRED EMBODIMENT

The following detailed description is of the best presently contemplated modes of carrying out the invention. This description is not to be taken in a limiting sense, but is made merely for purposes of illustrating the general principles of the invention since the scope of the invention is best defined by the appended claims.

Structural and operational characteristics attributed to forms of the invention first described shall also be attributed to forms later described, unless such characteristics are obviously inapplicable or unless specific exception is made.

Figure 3:
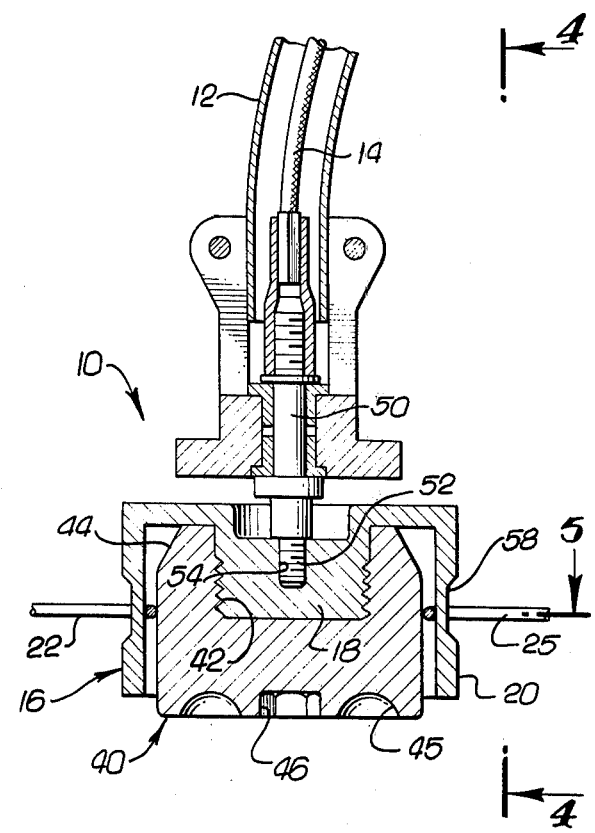
FIG. 3 is a futher enlarged vertical sectional view through the cutter head, and taken along a plane correponding to line 3—3 of FIG. 2.
Figure 1:
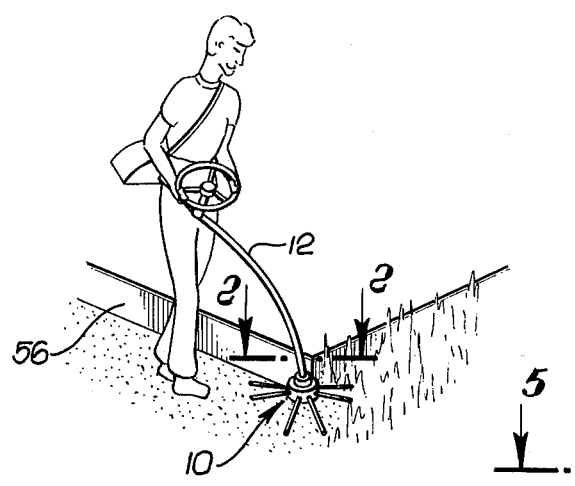
FIG. 1 is a pictorial view of an operator using a rotary garden cutter incorporating the present invention.
Figure 2:
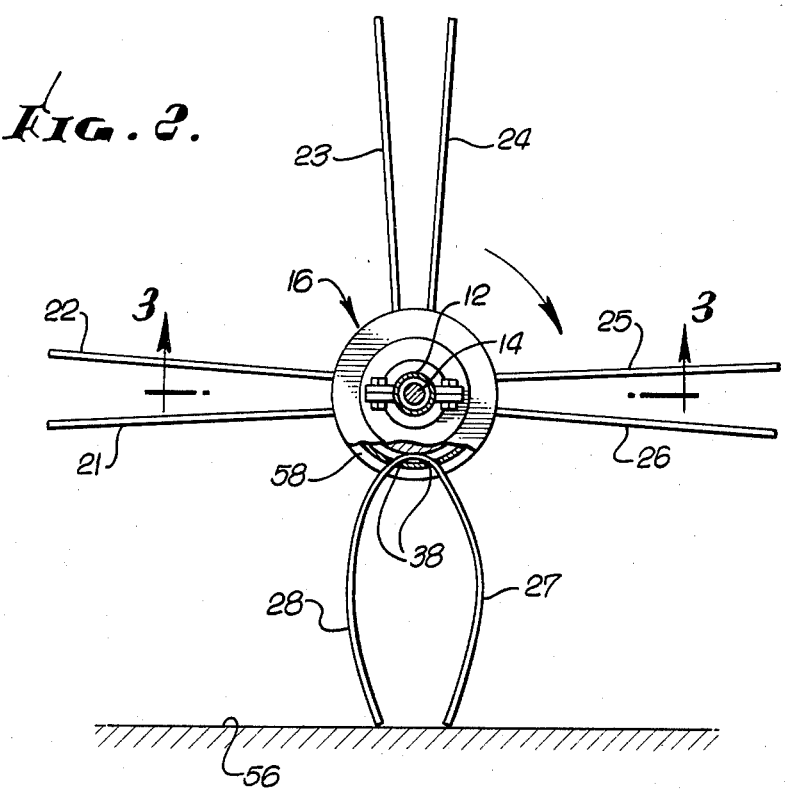
FIG. 2 is an enlarged sectional view taken along a plane corresponding to line 2—2 of FIG. 1, showing the cutter in action, a part of the apparatus being broken away and shown in section.

In FIG. 1, there is illustrated a rotary garden cutter 10 attached to the end of a power wand 12. The power wand 12 accommodates a flexible power shaft 14 (FIGS. 2 and 3) to which a cutter is attached.

The cutter 10 comprises two companion parts, a cutter line mounting part and a clamp part. The line mounting part is a rotary cutter head 16 that has the shape of an inverted cup. The head has a central hub 18 and a peripheral skirt 20 surrounding the hub. Extending from the peripheral skirt 20 are cutter lines, in this instance eight in number, 21-28. The cutter lines are preferably nylon monofilaments of about 0.10 inches or 2.5 millimeters in diameter. By rotating the cutter head 16 at about 3600 revolutions per minute (FIG. 2), the cutter lines assume a relatively rigid cutter blade characteristic. The lines 21 to 28 extend straight out under the influence of centrifugal force whatever the initial curvature of the lines may be. The lines, as shown in FIG. 5 may have an initial curved configuration imparted, perhaps, by the takeup spool fed from the extrusion head.

In order to fasten the lines to the skirt 20, the skirt as shown in FIG. 5 is provided with a number (four in this instance) of pairs of apertures 32, 34, 36 and 38 located in circular array about the skirt periphery. For each pair of apertures, a length of cutter line A, B, C and D is provided that is threaded in one of the apertures of the pair and then out the companion aperture of the pair.

The individual lines 21 and 22, for example, are formed as equal length ends of a single piece of cutter line A.

In order to hold the lines A, B, C and D in place, a generally cylindrical wedge or clamp 40 (FIG. 3) is provided. The clamp 40 fits into the cutter head 16 and has a screw threaded connection therewith. For this purpose, the clamp 40 has a threaded recess 42 that cooperates with peripheral threads on the cutter head hub 18. Other screw threaded arrangements are possible as between the periphery of the clamp and the bottom of the skirt. However, a recessed arrangement is preferred to prevent contamination by vegetation.

The clamp 40 has a generally cylindrical wall spaced from the interior cylindrical surface of the skirt by an amount just slightly greater than the diameter of the cutter line. The line, as it threads through companion apertures, bows inwardly, causing frictional contact with the periphery of the clamp. In order to insure that the clamp surface is properly positioned without shearing the cutter line, the leading or upper edge of the clamp is chamfered at 44.

In use, the centrifugal force on the companion cutter lines 21/22, 23/24, 25/26, 27/28 is nominally equal. Hence the clamping force required to keep the lines A, B, C and D in place is small. No high stress need be imposed on the line.

The wedge 40 is easily installed by spinning it into place. This is facilitated by a series of finger recesses 45 in the bottom surface of the wedge.

In order to renew the line, it is merely necessary to detach the wedge or clamp 40, pull out the remnants of the cutter line and insert new sections precut to the optimum length for the particular tool. If the clamp or wedge 40 resists movement, a suitable tool can be inserted at a socket 46.

The cutter head 16 shown in FIGS. 1 to 5 is readily attached to the spindle 50 of a power unit such as described in said U.S. Pat. No. 3,708,967. In the present instance, the spindle has a threaded projection 52 that readily attaches to a threaded socket 54 in the upper end of the cutter head hub 18.

When the cutter head is operated near a curb, stonework or other rigid object 56 (FIGS. 1 and 2), there is danger of the cutter line becoming mutilated by the interaction of the cutter head and the rigid object. To prevent this, the cutter head has a peripheral groove 58 at the place where the cutter line is mounted. The groove 58 is deep enough to provide a retreat for the cutter line.

DETAILED DESCRIPTION OF ALTERNATIVE EMBODIMENT

The means for connecting the cutter head to a rotary drive may take any desired form. In the preferred form, the cutter head simply has a socket for threaded connection to power head of a known device. Depending upon the structure of the rotary drive itself, the cutter head can be modified. Optionally, an adapter can be provided between the socket 54 and the rotary drive. In the form shown in FIG. 6, however, the rotary cutter head 70 has a shank 72 that may be gripped in a chuck 74 of a conventional hand drill 76. A simple holder for the hand drill (not shown) effectively lengthens the drill handle so that the cutter can be operated from a standing position.

In the present instance, the shank 72 is formed at the end of a machine screw 74 that projects through an aperture in a hub 77 of the cutter head. The screw is locked in place by nuts 78 and 80 on the outside and inside respectively. In the present instance, the cutter head clamp 82 has a threaded socket or opening that threadedly cooperates with the screw 74.

Intending to claim all novel, useful and unobvious features shown or described, I make the following claims:

I claim:

1. In a rotary garden cutter:
   a. a two part rotary cutter head;
   b. one of the parts of said cutter head having a peripheral wall surrounding a hollow interior, said wall being provided with a number of pairs of apertures extending substantially in circular array about said wall;
   c. a corresponding number of flexible cutter lines for the aperture pairs respectively, each of said lines being threaded into and out of the apertures of the corresponding pair, forming thereby two cutter elements extending from said cutter head periphery and forming a central portion exposed interiorly of said wall;
   d. the other of the parts of said cutter head comprising a clamp;
   e. means detachably connecting said cutter head parts together;
   f. said clamp part when connected to its companion cutter head part being positioned within said wall to engage the central portions of said cutter lines bridged by the pairs of apertures; and
   g. means connecting one of said cutter parts to a rotary power device.

2. In a rotary garden cutter:
   a. a two part rotary cutter head;
   b. one of the parts of said cutter head having a skirt that forms a downwardly opening recess, said skirt providing a peripheral wall having a number of pairs of apertures;
   c. a corresponding number of cutter lines for the aperture pairs respectively, each of said lines being threaded into and out of the apertures of the corresponding pair, forming thereby two cutter elements extending from said cutter head periphery;
   d. the other of the parts of said cutter head comprising a clamp detachably received in said downwardly opening recess;
   e. means detachably connecting said cutter head parts together;
   f. said clamp part having a substantially cylindrical periphery positioned to engage the central portions of said cutter lines bridged by the pairs of apertures when connected to its companion cutter head part; and
   g. means connecting one of said cutter parts to a rotary power device.

3. The combination as set forth in claim 2 in which said cutter head part has a central portion at its top provided with said connecting means, said clamp part having a series of recesses for digital engagement of the clamp.

4. The combination as set forth in claim 2 in which said detachable connecting means between said parts is located at the recessed inner end of the space formed by said skirt to be shielded from vegetation.

5. In a rotary garden cutter:
   a. a two part rotary cutter head;

b. one of the parts of said cutter head having a peripheral wall provided with a number of pairs of apertures;

c. a corresponding number of cutter lines for the aperture pairs respectively, each of said lines being threaded into and out of the apertures of the corresponding pair, forming thereby two cutter elements extending from said cutter head periphery;

d. the other of the parts of said cutter head comprising a clamp;

e. means detachably connecting said cutter head parts together;

f. said clamp part when connected to its companion cutter head part being positioned to engage the central portions of said cutter lines bridged by the pairs of apertures;

g. means connecting one of said cutter parts to a rotary power device;

h. said peripheral wall having an annular groove at the place of emergence of said cutter lines to form for said cutter lines, a protected recess to which said cutter lines retreated when said cutter head impinges upon curbing, stonework or other rigid objects.

* * * * *